United States Patent
Takii (10) Patent No.: US 9,387,793 B2
(45) Date of Patent: Jul. 12, 2016

(54) TRANSLATABLE VEHICLE LAMP (71) Applicant: KOITO MANUFACTURING CO., LTD., Tokyo (JP)

(72) Inventor: Naoki Takii, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 90 days.

(21) Appl. No.: 14/307,972

(22) Filed: Jun. 18, 2014

(65) Prior Publication Data

US 2015/0016137 A1    Jan. 15, 2015

(30) Foreign Application Priority Data

Jul. 10, 2013 (JP) ................................ 2013-144417

(51) Int. Cl.
*B60Q 1/00* (2006.01)
*B60Q 1/05* (2006.01)
*B60Q 1/076* (2006.01)

(52) U.S. Cl.
CPC ............ *B60Q 1/0041* (2013.01); *B60Q 1/0058* (2013.01); *B60Q 1/05* (2013.01); *B60Q 1/076* (2013.01); *B60Q 2200/36* (2013.01)

(58) Field of Classification Search
CPC ...... B60Q 1/068; B60Q 1/0041; B60Q 1/076; B60Q 1/0058; B60Q 1/05; B60Q 2200/36; F21V 14/02; F21V 19/02; F21V 21/14; F21V 21/16; F21S 48/1742
See application file for complete search history.

(56) References Cited

U.S. PATENT DOCUMENTS 8,496,365 B2 * 7/2013 Singh ................... B60Q 1/0041
                                                     362/527

FOREIGN PATENT DOCUMENTS

JP         2009087811          4/2009

* cited by examiner

*Primary Examiner* — Bao Q Truong
(74) *Attorney, Agent, or Firm* — Abelman, Frayne & Schwab

(57) ABSTRACT

Disclosed is a vehicle lamp. Three lamp units are arranged such that an optical axis of each lamp unit is oriented in a longitudinal direction of a vehicle body. A base of a front lamp unit is fixed to the vehicle body, and bases of a middle lamp unit and a rear lamp unit are provided to be movable in a widthwise direction of the vehicle body. A housing of each of the middle and rear lamp units is suspended on an output shaft of an actuator by an arm. The actuator pivots the output shaft around a horizontal axis and swings the arm around an axis in which is parallel with the optical axes of the middle and rear lamp units.

4 Claims, 11 Drawing Sheets

TRANSLATABLE VEHICLE LAMP

CROSS-REFERENCE TO RELATED APPLICATIONS

This application is based on and claims priority from Japanese Patent Application No. 2013-144417 filed on Jul. 10, 2013, with the Japan Patent Office, the disclosure of which is incorporated herein in its entirety by reference.

TECHNICAL FIELD

The present disclosure relates to a vehicle lamp provided with a translatable lamp unit.

BACKGROUND

Figure 10:
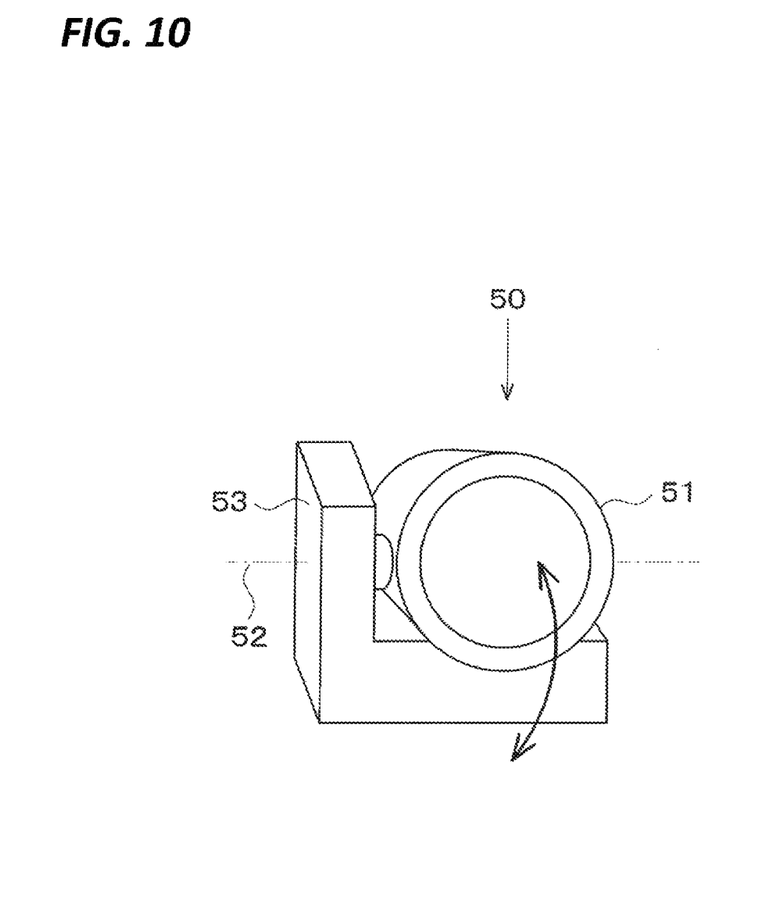
FIG. 10 is a perspective view illustrating a vehicle lamp in the related art.
Figure 11A:
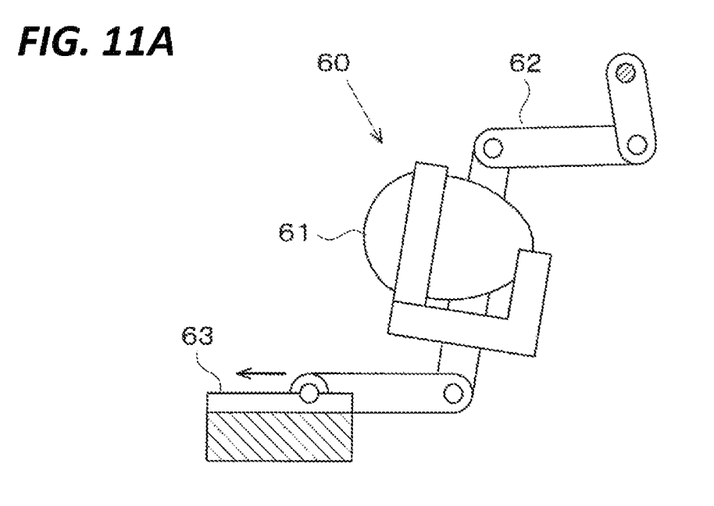
FIGS. 11A and 11B are side views illustrating another vehicle lamp in the related art.
Figure 11B:
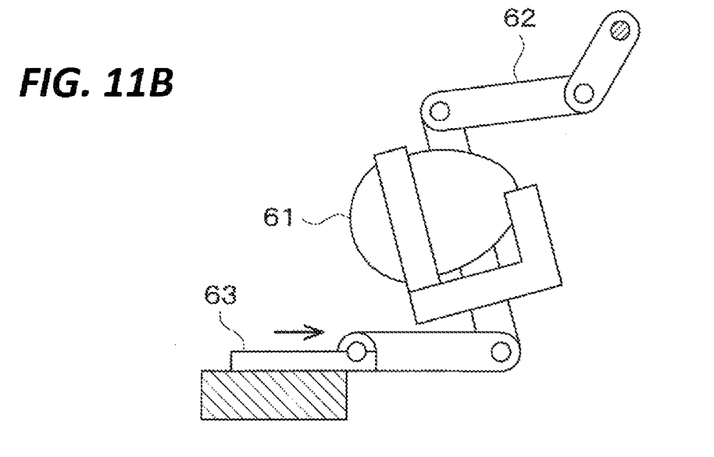

A technique of moving whole lamp units in consideration of appearance or light distribution has been known in the related art. For example, in a vehicle lamp 50 as illustrated in FIG. 10, a lamp unit 51 is supported to be tiltable around a horizontal axis 52, and appears out of or disappears into a vehicle body by an actuator 53. In a vehicle lamp 60 as illustrated in FIGS. 11A and 11B, in order to perform a leveling, a lamp unit 61 is supported by a link mechanism 62 and driven by an actuator 63.

Japanese Patent Laid-Open Publication No. 2009-87811 discloses a vehicle lamp in which semiconductor light emitting devices such as LEDs are used for light sources of auxiliary lamp units, the auxiliary lamp units are supported to be tiltable in a vertical direction and pivotable in a horizontal direction in order to change vertical and horizontal light distribution patterns such that an irradiation direction is able to be changed in the directions of two axes orthogonal to each other.

SUMMARY

However, according to the vehicle lamps in the related art, a lamp unit may be tilted or pivoted, but the whole lamp units may not be moved greatly. Therefore, there is a problem in that, even though a light distribution of a lamp unit may be changed, appearance of a vehicle lamp could not be changed.

Accordingly, an object of the present disclosure is to provide a vehicle lamp capable of greatly moving whole lamp units to dynamically change appearance of a vehicle lamp.

In order to overcome the above-mentioned problem, the present disclosure provides a vehicle lamp.

The vehicle lamp includes a lamp unit provided with a light source; and a driving mechanism configured to translate the lamp unit.

In the above-mentioned vehicle lamp, the driving mechanism is provided with an arm configured to hang the lamp unit, and an actuator configured to swing the arm around an axis which is parallel with an optical axis of the lamp unit.

In the above-mentioned vehicle lamp, the driving mechanism is provided with a plurality of shafts configured to separately support a plurality of lamp units, a cam member configured to approach and separate respective shafts in relation to each other, and an actuator configured to drive the cam member.

In the above-mentioned vehicle lamp, the driving mechanism is provided with a plurality of holders configured to separately hold a plurality of lamp units, a rail configured to slidably support the respective holders, a flexible member extending along the rail, and an actuator configured to drive the respective holders through the flexible member.

In the above-mentioned vehicle lamp, the driving mechanism is provided with a holder configured to hold the lamp unit, a pantograph configured to elevatably support the holder, and an actuator configured to expand or contract the pantograph.

The vehicle lamp of the present disclosure translates lamp units by a driving mechanism. Therefore, the vehicle lamp of the present disclosure has an excellent effect in that the whole lamp units are greatly moved to dynamically change the appearance of the vehicle lamp.

The above-described summary is illustration purposes only and does not intend to limit in any ways. In addition to the illustrative embodiment, examples, and features described above, additional embodiment, example, and features will become apparent by referring to the drawings and the following detailed description.

DETAILED DESCRIPTION

In the following detailed description, reference is made to the accompanying drawing, which form a part hereof. The illustrative exemplary embodiments described in the detailed description, drawings, and claims are not meant to be limiting. Other exemplary embodiments may be utilized, and other changes may be made, without departing from the spirit or scope of the subject matter presented here.

Figure 4:
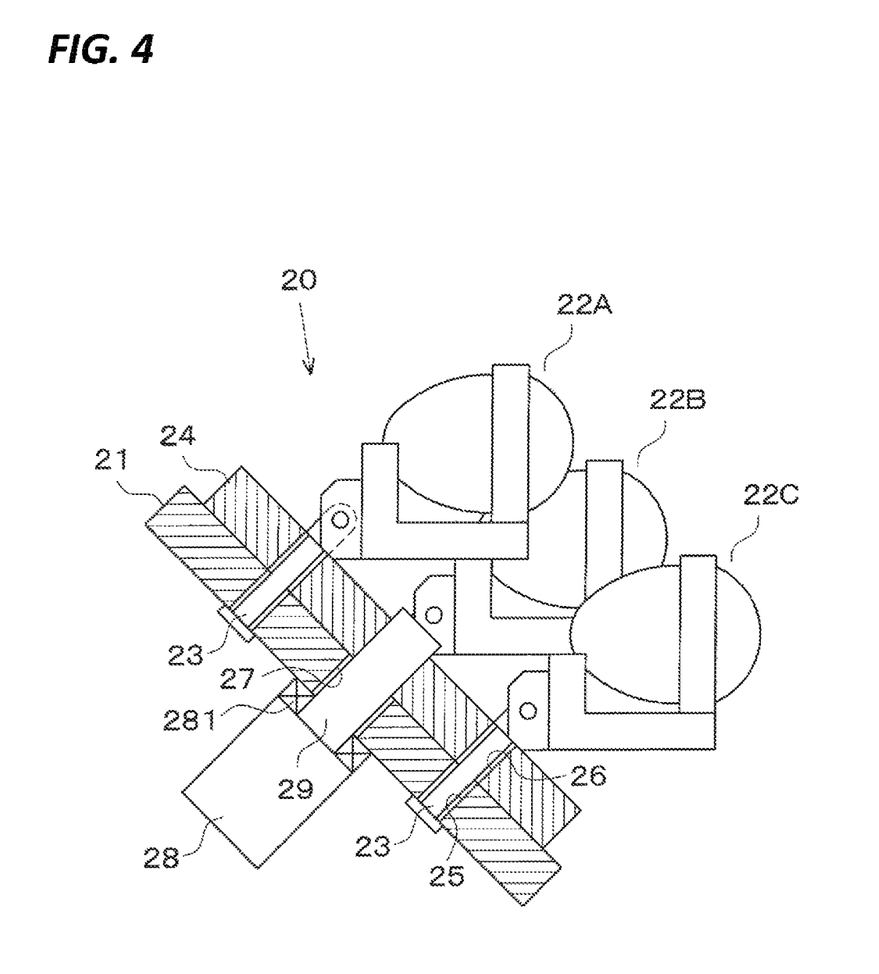
FIG. 4 is a cross-sectional view illustrating a vehicle lamp of Example 2.
Figure 5A:
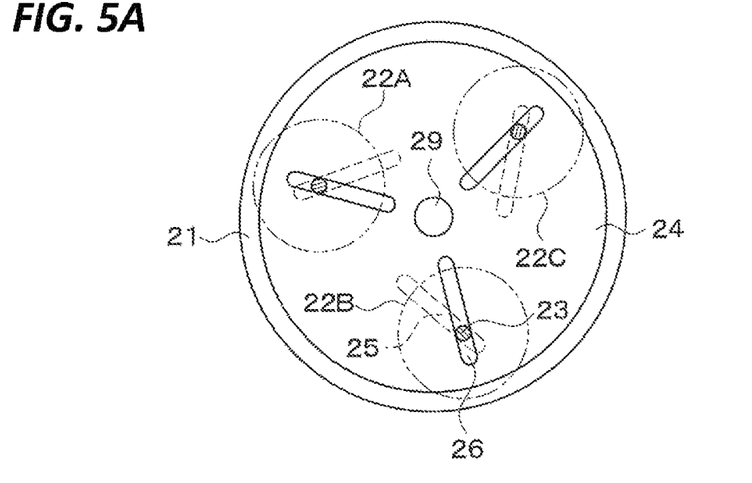
FIGS. 5A and 5B are front views illustrating an operation of the vehicle lamp of Example 2.
Figure 5B:
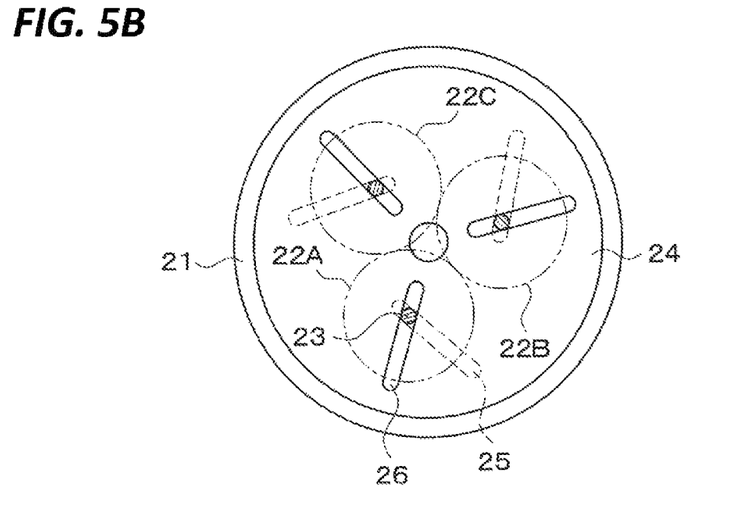
Figure 6:
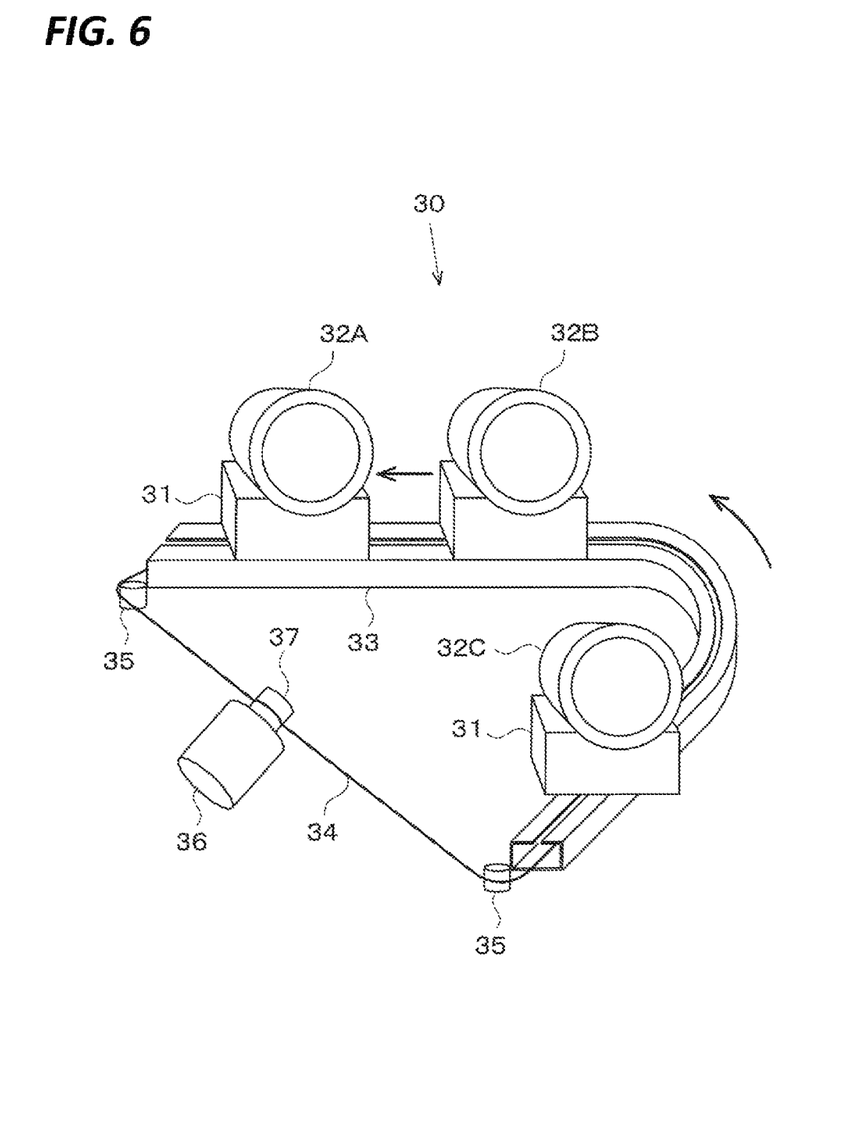
FIG. 6 is a perspective view illustrating a vehicle lamp of Example 3.
Figure 7:
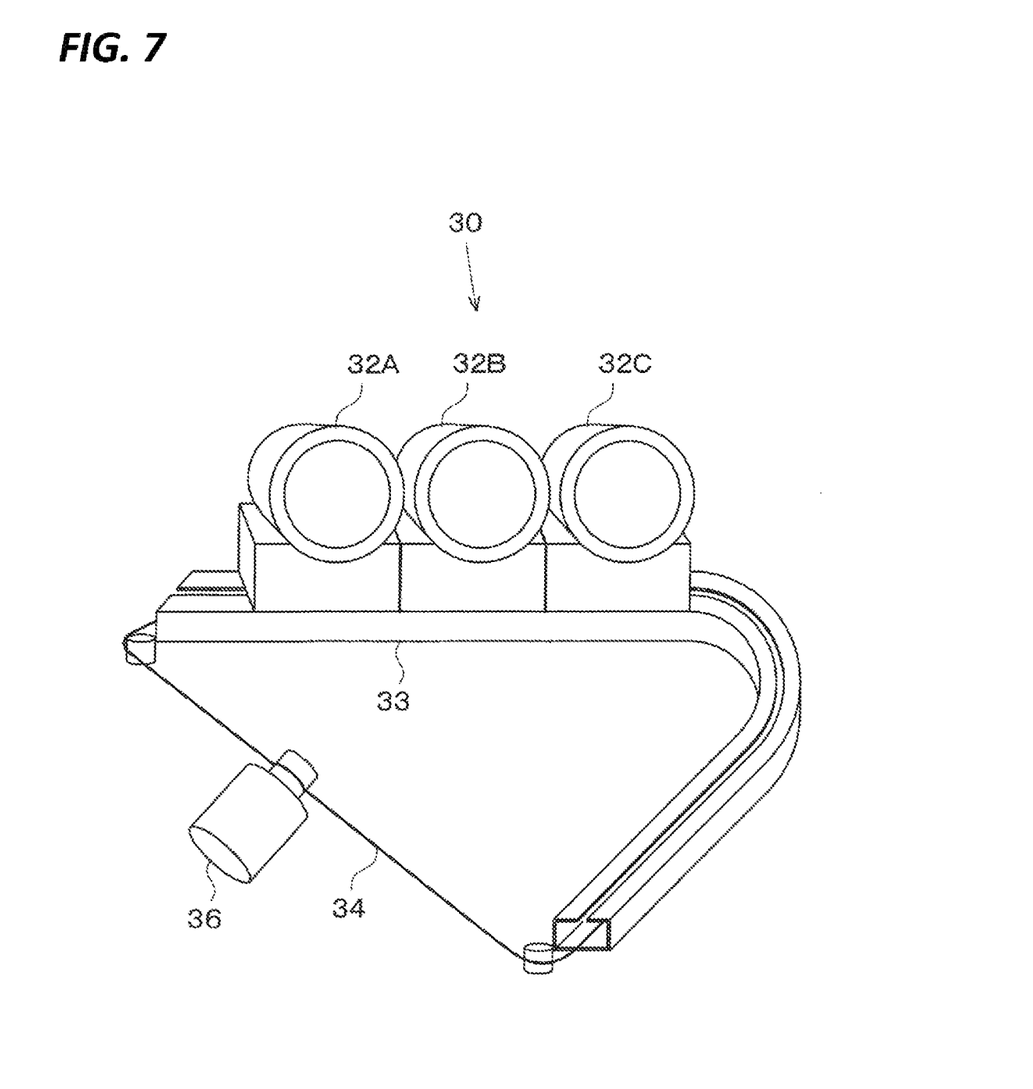
FIG. 7 is a perspective view illustrating an operation of the vehicle lamp of Example 3.
Figure 8:
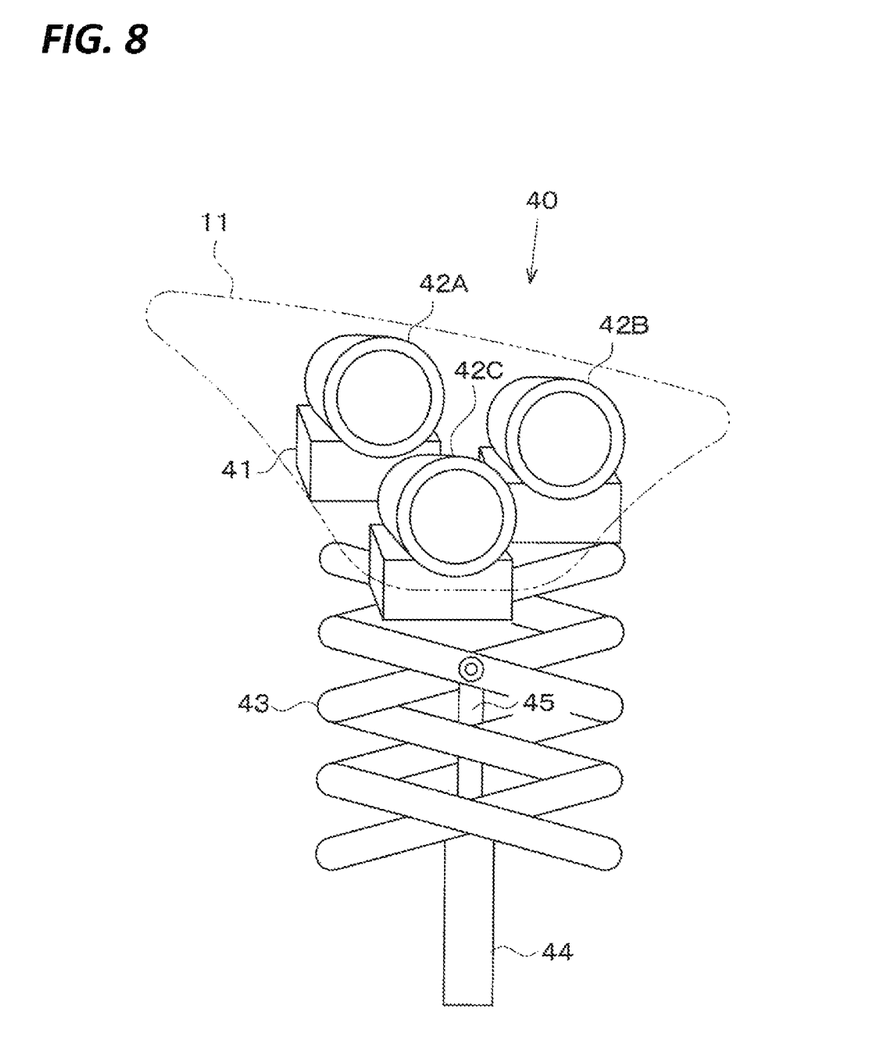
FIG. 8 is a front view illustrating a vehicle lamp of Example 4.
Figure 9:
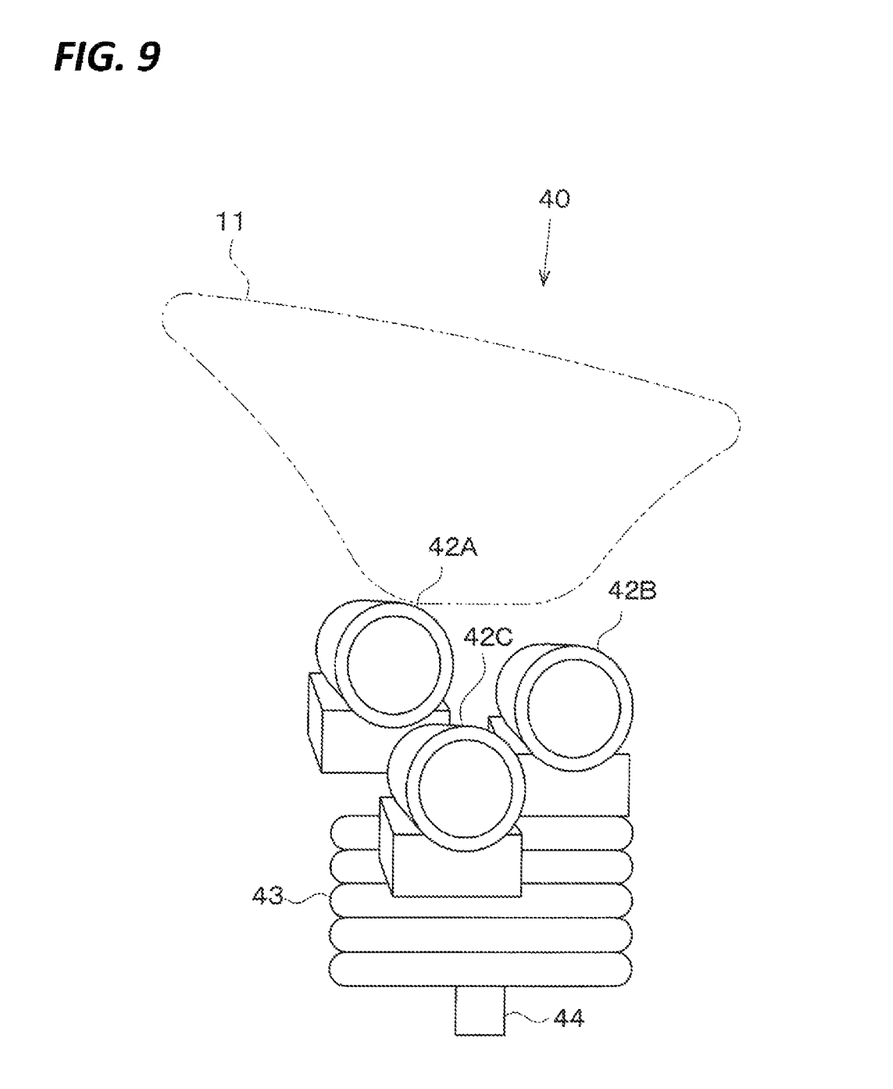
FIG. 9 is a front view illustrating an operation of the vehicle lamp of Example 4.

Hereinafter, exemplary embodiments of the present disclosure will be described with reference to the accompanying drawings. FIGS. 1, 2, 3A, and 3B illustrate a vehicle lamp 10 of Example 1, FIGS. 4, 5A, and 5B illustrate a vehicle lamp 20 of Example 2, FIGS. 6 and 7 illustrate a vehicle lamp 30 of Example 3, and FIGS. 8 and 9 illustrate a vehicle lamp 40 of Example 4.

Example 1

Figure 1:
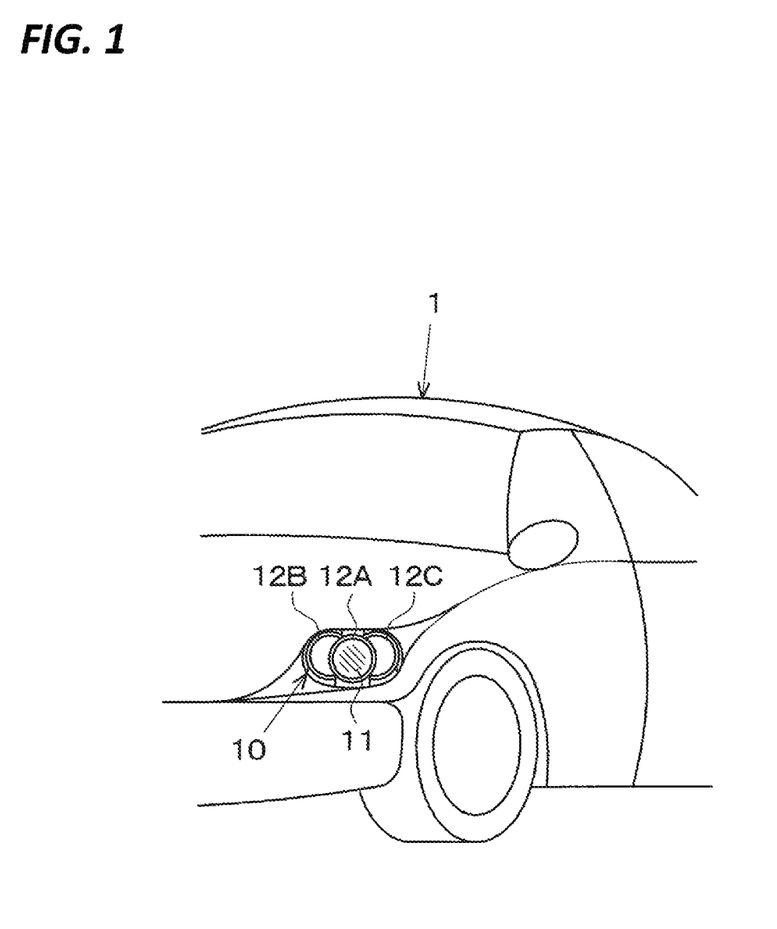
FIG. 1 is a perspective view of a vehicle illustrating Example 1 of the present disclosure.

As illustrated in FIG. 1, the vehicle lamp 10 of Example 1 is a vehicle headlamp which includes a lamp cover 11 on a front end of a vehicle body 1, and three lamp units 12A, 12B, 12C are provided inside the lamp cover 11.

Figure 2:
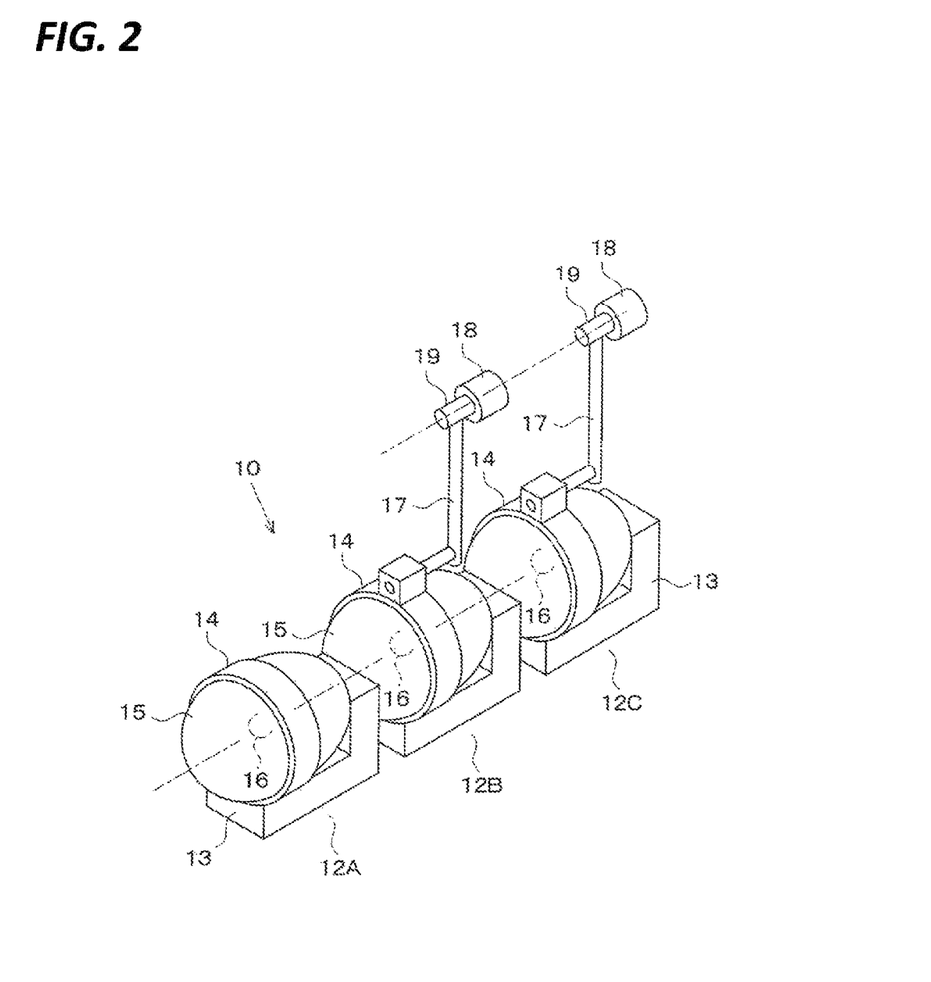
FIG. 2 is a perspective view illustrating a vehicle lamp of Example 1.

As illustrated in FIG. 2, each of the lamp units 12A to 12C is provided with a housing 14 on a base 13, and a projector lens 15 is mounted on a front end of the housing 14. A light source 16 and a reflector (not illustrated) are provided inside the housing 14, and light from the light source 16 is irradiated in front of a vehicle through the projector lens 15 and the lamp cover 11.

The lamp units 12A to 12C are arranged such that an optical axis (indicated by a dashed line) of each of the lamp units 12A to 12C is oriented in a longitudinal direction of the vehicle body 1. The front lamp unit ("first lamp unit") 12A is provided such that the base 13 thereof is fixed to the vehicle body 1, and the middle lamp unit ("second lamp unit") 12B and the rear lamp unit ("third lamp unit") 12C are provided such that the bases 13 thereof are movable in a widthwise direction with respect to the vehicle body 1.

A housing 14 of each of the second and third lamp units 12B, 12C is suspended on an output shaft 19 of an actuator 18 by an arm 17. The actuator 18 is fixed to the vehicle body 1 above the housing 14, and pivots the output shaft 19 around a horizontal axis (indicated by a dashed line). And, a driving mechanism is constituted by the arm 17 and the actuator 18, and configured to swing the arm 17 in the widthwise direction of the vehicle body 1 around an axis which is parallel with the optical axis of the lamp units 12B, 12C by the actuator 18.

Figure 3A:
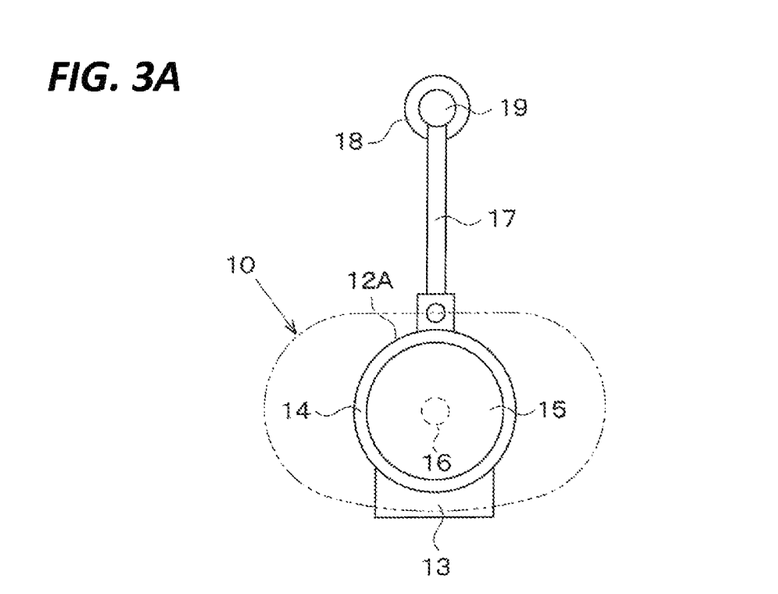
FIGS. 3A and 3B are front views illustrating an operation of the vehicle lamp of Example 1.
Figure 3B:
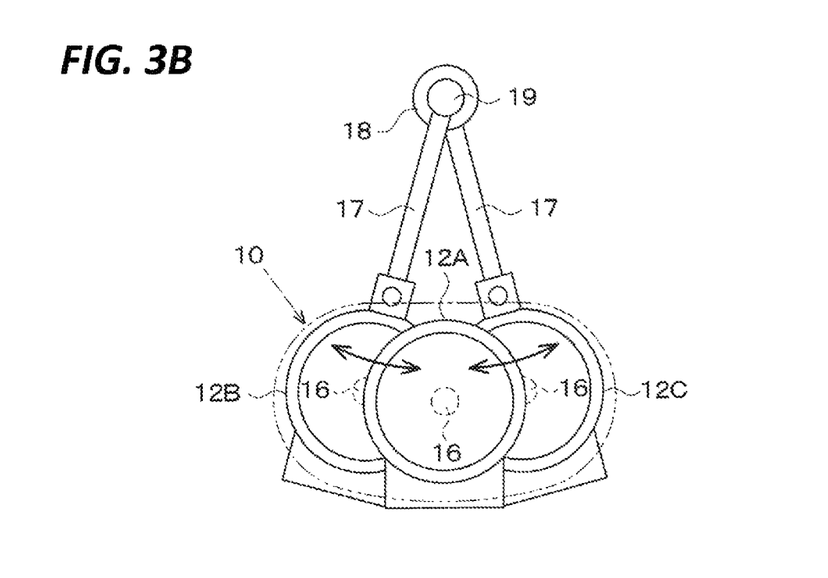

According to the vehicle lamp 10 of Example 1, the appearance of the lamp may be shown as a monocular (actually, binocular) headlamp in a state where three lamp units 12A to 12C are aligned in a row, as illustrated in FIG. 3A. Meanwhile, it is possible to make light from the light source 16 look as if the light is an afterglow of the first lamp unit 12A, by swinging the arms 17 by the actuators 18 to greatly translate one or both of the second and third lamp units 12B, 12C in the widthwise direction, as illustrated in FIG. 3B.

Further, the light distribution pattern of the whole lamp may be changed variously in accordance with the translation of the second and third lamp units 12B, 12C by controlling turning-on/off or brightness of the first to third lamp units 12A to 12C individually. Moreover, when the second and third lamp units 12B, 12C are turned on at one side or both sides of the first lamp unit 12A in a predetermined timing, the appearance of the lamp may be dynamically changed, for example, causing the vehicle lamp 10 to be shown as a binocular headlamp.

Example 2

As illustrated in FIGS. 4, 5A, and 5B, the vehicle lamp 20 of Example 2 includes three lamp units 22A, 22B, 22C on a disc 21. The lamp units 22A to 22C are supported separately by three shafts 23 on the disc 21. A cam member 24 is rotatably joined to the disc 21, and the disc 21 and the cam member 24 are formed with cam slots 25, 26 though which the shafts 23 pass, respectively.

An output shaft 29 of an actuator 28 passes through a center hole 27 of the disc 21, and a tip end of the output shaft 29 is fixedly coupled to the cam member 24. In addition, the vehicle lamp 20 is configured such that when the cam member 24 is rotated by the actuator 28 to approach or separate the shafts 23 in relation to each other according to the cam shapes of the cam slots 25, 26, each of the respective lamp units 22A to 22C are disposed at position positions where the lamp units 22A to 22C are distributed to an outer periphery of the disc 21 (see, e.g., FIG. 5A) or at positions where the lamp units 22A to 22C are collected to the center of the disc 21 (see, e.g., FIG. 5B).

According to the vehicle lamp 20 of Example 2, the appearance and the light distribution pattern of the lamp may be dynamically changed by greatly translating the first to third lamp units 22A to 22C in a radial direction of the disc 21. Further, when a clutch 281 is provided in the actuator 28 so that the power of the output shaft 29 may be transmitted to the disc 21 by the clutch 281, the three lamp units 22A to 22C may be rotated simultaneously.

Example 3

As illustrated in FIGS. 6 and 7, in the vehicle lamp 30 of Example 3, three lamp units 32A, 32B, 32C are held in separate holders 31, respectively, and each of the holders 31 is slidably supported on a rail 33. The rail 33 is curved to match the contour of the lamp 30, and is provided with a wire 34 as a flexible member therein. The wire 34 is guided by a pulley 35 and connected to an output shaft 37 of an actuator 36 such that each of the lamp units 32A to 32C is reciprocated on the rail 33 through the wire 34 by the actuator 36.

According to the vehicle lamp 30 of Example 3, the appearance and the light distribution pattern of the vehicle lamp 30 may be dynamically changed by greatly translating the three lamp units 32A to 32C along the rail 33 to be disposed at distributed positions in a triangular shape as illustrated in FIG. 6 or at collected positions in a row as illustrated in FIG. 7. Further, a belt or chain may also be used as the flexible member in place of the wire 34.

Example 4

As illustrated in FIGS. 8 and 9, in the vehicle lamp 40 of Example 4, three lamp units 42A, 42B, 42C are held in separately holders 41, respectively, and each of the holders 41 is elevatably supported by a pantograph 43. The pantograph 43 is connected to an output shaft 45 of an actuator 44. The pantograph 43 is expanded or contracted by linear movement of the output shaft 45.

When the pantograph 43 is expanded as illustrated in FIG. 8, the three lamp units 42A to 42C are disposed inside a lamp cover 11. When the pantograph 43 is contracted as illustrated in FIG. 9, each of the lamp units 42A to 42C is disposed inside the vehicle body 1 to be invisible from the lamp cover 11. Accordingly, also in Example 4, the appearance of the lamp 40 may be dynamically changed by translating the lamp units 42A to 42C vertically in a large stroke.

Further, the present disclosure is not limited to the above-mentioned exemplary embodiments. The present disclosure may be implemented by appropriately modifying the configuration of each part, for example, by increasing or decreasing the number of the lamp units, or changing the kind of the actuator or the use of the lamp without departing from the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. A vehicle lamp comprising:
a lamp unit provided with a light source; and
a driving mechanism configured to translate the lamp unit,
wherein the driving mechanism includes a plurality of holders configured to hold a plurality of lamp units, respectively, a rail configured to slidably support the respective holders, a flexible member extending along the rail, and a first actuator configured to drive the respective holders through the flexible member.

2. The vehicle lamp of claim 1, wherein the driving mechanism includes a plurality of arms configured to hang the plurality of lamp units, and a plurality of second actuators configured to swing one or more of the plurality of arms around an axis which is parallel with an optical axis of the plurality of lamp units.

3. The vehicle lamp of claim 1, wherein the driving mechanism includes a plurality of shafts configured to support the plurality of lamp units, respectively, a cam member configured to approach and separate respective shafts in relation to each other, and a third actuator configured to drive the cam member.

4. The vehicle lamp of claim 1, wherein the driving mechanism includes a plurality of holders configured to hold the plurality of lamp units, respectively, a pantograph configured to elevatably support the plurality of holders, and a fourth actuator configured to expand or contract the pantograph.

* * * * *